(12) United States Patent
Shoffner et al.

(10) Patent No.: US 9,050,726 B2
(45) Date of Patent: Jun. 9, 2015

(54) ACTIVATION CONTROL DEVICE FOR ROBOTIC AUXILIARY DEVICES

(71) Applicant: GI² Technologies, LLC, Port Matilda, PA (US)

(72) Inventors: Brent William Shoffner, Port Matilda, PA (US); Adam Paul Jaroh, Erie, PA (US)

(73) Assignee: GI 2 TECHNOLOGIES, LLC, Port Matilda, PA (US)

( * ) Notice: Subject to any disclaimer, the term of this patent is extended or adjusted under 35 U.S.C. 154(b) by 282 days.

(21) Appl. No.: 13/785,374

(22) Filed: Mar. 5, 2013

(65) Prior Publication Data

US 2013/0310972 A1 Nov. 21, 2013

Related U.S. Application Data

(60) Provisional application No. 61/647,775, filed on May 16, 2012.

(51) Int. Cl.
*G06F 19/00* (2011.01)
*B25J 9/16* (2006.01)
*B25J 9/10* (2006.01)

(52) U.S. Cl.
CPC ............... *B25J 9/1679* (2013.01); *B25J 9/104* (2013.01)

(58) Field of Classification Search
USPC .......................................................... 700/245
See application file for complete search history.

(56) References Cited

U.S. PATENT DOCUMENTS

| | | | | | |
|---|---|---|---|---|---|
| 4,475,160 | A | * | 10/1984 | Inaba | 318/568.16 |
| 4,679,488 | A | * | 7/1987 | Krutz et al. | 91/1 |
| 5,314,722 | A | * | 5/1994 | Kobayashi | 427/425 |
| 5,861,813 | A | * | 1/1999 | Futsuhara | 340/648 |
| 6,936,224 | B2 | * | 8/2005 | Fichera et al. | 422/63 |
| 7,443,121 | B2 | * | 10/2008 | Nagai et al. | 318/434 |
| 2009/0105880 | A1 | * | 4/2009 | Okazaki | 700/258 |
| 2011/0010010 | A1 | * | 1/2011 | Kai et al. | 700/255 |

* cited by examiner

*Primary Examiner* — Nicholas Kiswanto
(74) *Attorney, Agent, or Firm* — Gianna J. Arnold; Saul Ewing LLP

(57) ABSTRACT

Disclosed herein is a system for controlling "on"/"off" functionality of an auxiliary device including a circuit designed to monitor physical rotations. The device will activate or deactivate when predetermined rotations are sensed by the circuit within a specific time period. The circuit can be used on high vibration tooling such as grinders and saws due to its resistance to relatively large vibrational noise. The circuit also includes a current sensing device to determine when the auxiliary device draws too much current. When an over current situation is measured, the circuit will automatically shut down to protect the device's electronic components. This control system can be implemented in new device designs, or installed as a retrofit control mechanism to existing commercially available devices.

23 Claims, 4 Drawing Sheets

ACTIVATION CONTROL DEVICE FOR ROBOTIC AUXILIARY DEVICES

CROSS-REFERENCE TO RELATED APPLICATION

This application claims priority under Title 35, United States Code, Section 119(e), to U.S. Provisional Application Ser. No. 61/647,775 titled "Control Device for Robotic Power Tools," filed May 16, 2012, which is incorporated herein, in its entirety, by this reference.

FIELD OF THE INVENTION

The present invention relates to indirect control of robotic power tools and external auxiliary devices. More particularly, this invention relates to a control device for activation and deactivation of external devices used by robots.

BACKGROUND OF THE INVENTION

Robotic platforms ("robots") are frequently employed by industrial, law enforcement, military, tactical, explosive, and hazmat response groups. These robots are equipped with specialized external devices such as power tools, camera systems, disrupters, etc. that allow the robot to complete a myriad of tasks. Existing technology uses one of two methods to control and power the accessories affixed to the robot: 1) tethered methods; and 2) contacts integrated into the gripper.

In this first method, requisite devices are tethered to the robot by use of electrical cabling to transmit power and/or control commands to the devices. Generally, the tools obtain their electrical connection via an auxiliary port on the robot. This auxiliary port is necessary to turn the devices "on" and "off." Auxiliary port locations vary by robotic platform and most require a cable to connect the robot's auxiliary ports to the tool. Many robots are equipped with a 360-degree continuously rotating "gripper." Tools equipped with a mechanical bracket to interface with the robot hold the accessories for proper deployment. Tools that are tethered to the robot increase the likelihood for the tethering cable to become caught, snagged, or severed. When the tethering cable becomes wrapped around the robot, it often limits the capabilities of the robot and the tool. A severed tethering cable often renders the tool useless.

An additional drawback of tethering is the limited control the operator has with regard to the tools. For example, when a tool is tethered and placed in the robot's gripper, the operator is then unable to drop the tool so that the robot might manipulate a different object with the gripper. Thus, when the operating technician wishes to change tasks, they must recall the robot to a location where a human is required to remove the tool and disconnect the tether. Such procedures not only occupy critical time, but also place the human in potentially dangerous environments.

During Explosive Ordnance Disposal ("EOD") operations, time is often of the essence. Aside from the rather obvious implications where viable explosive threats are present, municipalities incur significant financial costs when investigating potential threats. "Downtime" at venues such as airports, train stations, and sporting events, quickly equate to revenue losses.

The second method involves a gripper that features integrated auxiliary connections. In addition to the gripper, the tools must be equipped with mating connections. When the gripper squeezes down on to a particular tool, an electrical connection is made. These electrical contacts remove the need for tethered tools. A problem with integrated electrical contacts is realized when considered with regard to the gripper's continuous rotation movement. Because the gripper rotates continuously, the power and control contacts are passed through a "slip ring" mechanism. Categorically, slip rings are rather expensive components that cannot easily be retrofitted onto existing robotic platforms and are prone to failure.

Notwithstanding which of the forgoing methods is used, the robot must be equipped with an auxiliary port to provide power or control to the tool. A reality of the robotic platforms currently in existence is that auxiliary ports are few in number and are typically already utilized by other robotic accessories.

Other low-tech methods used to control the robot and its tools involve include: 1/engaging the tool before the operator sends the robot downrange; or 2/integrating radio transmitters into the tool to facilitate its control.

Accordingly, there is a need for an improved means to control power tools used in robotics applications.

SUMMARY OF THE INVENTION

The present invention provides a mechanism that permits any device requiring "on"/"off" control to be controlled by existing robotic platforms. The invention is a self-contained solution that alleviates the foregoing detriments of existing technologies by integrating all power and control mechanisms directly within the cordless external device. When the invention is utilized in concert with a robotic platform, electrical connections between the external device and robot are no longer needed. Through the teaching of the present invention, tethering is no longer needed to power and transmit instructions to the tools.

It is therefore an object of the invention to provide a control device for external devices such as power tools and camera systems that affix to commonly utilized robots including but not limited to robots used to service military, civilian or industrial needs.

It is a further object to utilize the proposed circuit in new devices or install the control circuit in existing devices as a retrofit.

It is a further object to provide a rotationally-activated control circuit to be utilized on such external devices. The invention can be implemented on any cordless power tool, auxiliary camera system, disrupter as a trigger mechanism, or used to power hydraulic and pneumatic tools by controlling the solenoids used to actuate valves.

It is a further object to provide a control device for use in Explosive Ordinance Disposal (EOD) and industrial robotic applications.

It is a further object of the invention to provide a means to control the on/off operation of an external device without a cable or electrical connection between the robotic platform and the external device.

It is a further object of the invention to sense a motion event input from the robot to create a response from the proposed control circuit. This input is to be unique in that a full rotation from a specific robot's gripper assembly will take a specific amount of time and thus the control circuit compares the measured rotation to an amount of time equivalent to the performance benchmarked by a specific robot's mechanics.

It is a further object of the invention to prevent failure of the external device due to over-current during a stall condition.

It is a further object of the invention to provide a smart switch with current monitoring capabilities that provides feedback to a microprocessor as to the amount of current the external device is drawing, and where the processing circuitry is configured to deactivate the smart switch if the electrical current rises to unsafe levels. The system is designed to ignore the large current spike that occurs when the device is first turned on since the motor is momentarily stalled by its own inertia. When a stall state is experienced after startup, the control circuit can only be activated after an initialization motion input is measured by the motion sensing device.

It is a further object of the invention to provide a circuit used to control the "on"/"off" operation of an external device.

It is a further object of the invention to provide a motion monitoring means such as a tilt switch and a microprocessor, and where the processing circuitry is configured to determine if the external device is physically manipulated in a predetermined movement equivalent to the dynamics of a specific robot platform.

It is a further object of the invention to provide a motion monitoring means that is resistant to high vibrations as seen in certain power tools such as grinders, circular saws, and other large devices.

It is a further object of the invention to provide a circuit powering means.

It is a further object of the invention to provide a contact switch, whereby the contact switch is activated by a robot gripper when it engages the device housing, the activation serving to power the microprocessor as described herein, thereby allowing the microcontroller to monitor outputs from the motion sensing device within the circuit, the contact switch further serving as a "kill switch" when the robot gripper releases the tool's housing It is a further object of the invention to provide a mechanical housing for spring loading the interface between the robotic gripper and the device including a spring loaded slide mechanism, a mechanical attachment to the tool and a mechanical attachment to the robotic gripper assembly where the spring loaded slide mechanism is placed in series between the attachment to the device and the attachment to the robotic gripper to allow compliance between the two, the compliant spring loaded holder mechanism surrounds the drill bit or grinding wheel or saw blade to determine proximity of device with material before it engages with the tool, the spring loaded force allows compliance in the system for the tool to cut/grind/bore at the system's optimal rate, over exertion by the robot onto the device into material is mitigated to prevent or alleviate stall condition or damage to the tooling.

It is a further object of the invention to provide a tool housing having a switch positioned between the external device attachment and the robotic gripper attachment to determine if the device is pressed against a material with force by the robotic gripper.

It is a further object of the invention to provide means such that the switch can provide an input to the aforementioned circuit.

It is a further object of the invention to activate an external device upon input from the aforementioned switch indicating application of force onto device into a material.

It is a further object of the invention to provide a mechanical housing providing a rigid attachment between the robot gripper attachment and the device, the housing including a feeler probe extending from the housing to an interface of tooling and material, a proximity sensing electromechanical device monitoring feeler probe, processing circuitry configured to activate the external device when the feeler probe is activated due to proximity to material to be engaged by device and/or to deactivate the external device when the feeler probe is deactivated due to lack of proximity to material to be engaged by device.

These and other objects are achieved in the present invention. There has thus been outlined, rather broadly, exemplary features of the invention in order that the detailed description thereof that follows may be better understood, and in order that the present contribution to the art may be better appreciated. There are, of course, additional features of the invention that will be described further hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that equivalent constructions insofar as they do not depart from the spirit and scope of the present invention, are included in the present invention.

For a better understanding of the invention, its operating advantages and the specific objects attained by its uses, reference should be had to the accompanying drawings and descriptive matter which illustrate preferred embodiments of the invention.

DETAILED DESCRIPTION OF THE INVENTION

Figure 1:
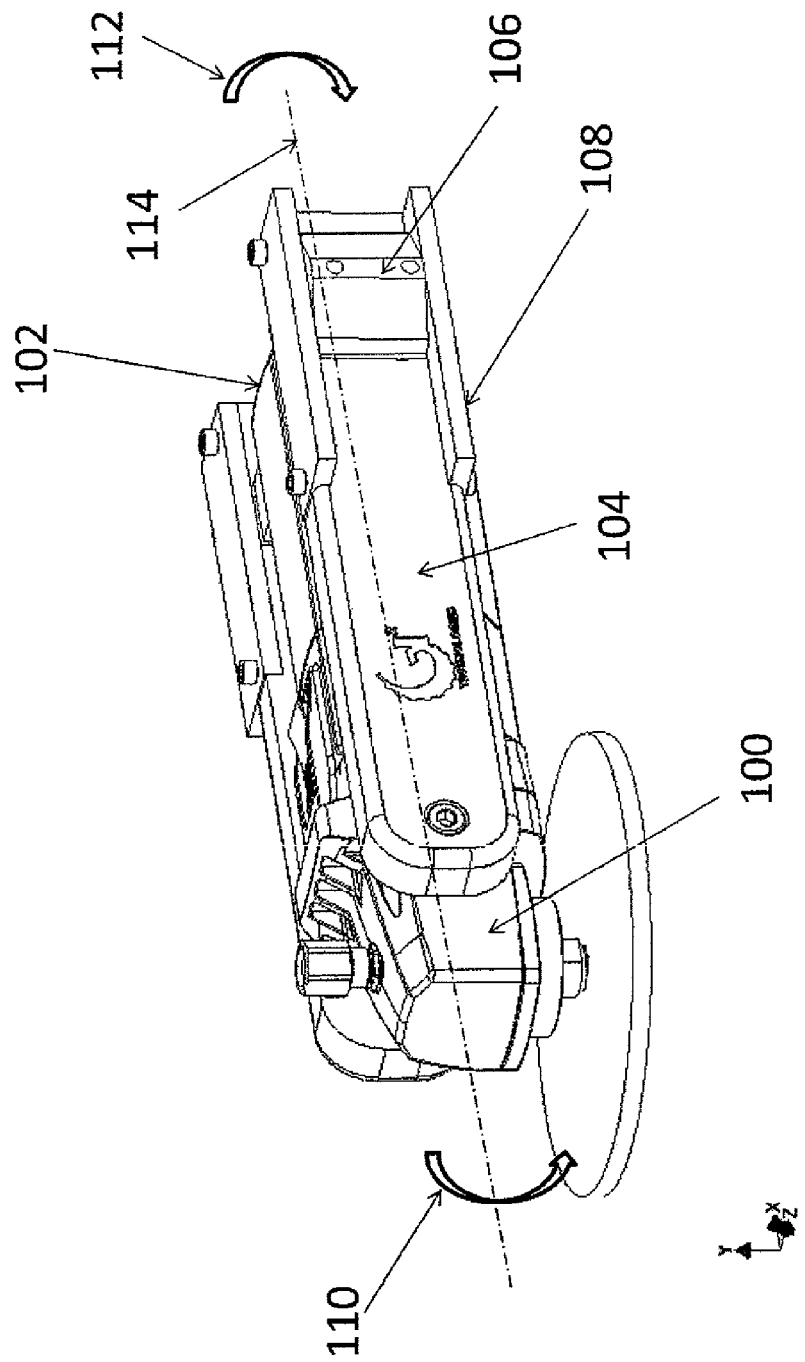
FIG. 1 illustrates a perspective view of a rotation activated tool system equipped cordless grinder.

The control device of the present invention eliminates the need for other control techniques currently in use such as tethered cables, integrated gripper contacts, wireless control transmission, or pre-deployment activation of the external device. In the present invention, a printed circuit board (PCB) equipped with a microcontroller, motion sensing device (i.e. tilt switch or accelerometer) and smart sensing switch controls an external device such as power tools used in robotics applications. As used herein, the term "tilt switch" and the like refer to a device that contains a switch and a gravity element, wherein the gravity element remains vertical when the device is inclined and turns the switch when inclination passes a preset or predetermined threshold. Many kinds of tilt switches exist in the market, which differ by operation method and specifications. A tilt switch has proven to be reliable during high vibration environments when data filtering techniques are also employed.

Examples of accessory devices include but are not limited to reciprocating saws, grinders, circular saws, rotary tools, drills, auto-hammers, camera systems and disrupters. An exemplary on/off signal is 360 degree rotation of a tool in a robot's gripper in a set period of time. The tilt switch senses the clockwise rotation of the gripper in a set period of time and turns the tool on. When the gripper is rotated 360 degrees counterclockwise in a set period of time the power tool is turned off. The set period of time is equal to the amount of time the robot can dynamically move its gripper holding the external device. The specific amount of time is used to activate the tool only when the operator intends to turn the tool on or off. The tilt switch monitors rotation with a resolution of 90 degrees. The switch monitors which of the 4 quadrants the device has been rotated through and determines the proper sequence and timing. During a quadrant transition the tilt switch's signal will oscillate between the two outputs. The microcontroller will monitor this transition and neglect it from the reading. The large resolution of the sensor in conjunction with a proper timing sequence create a robust system that is immune to high vibrations that would otherwise cause unexpected deactivation.

When a human uses a power tool that becomes stuck in the work piece, they release the switch or promptly withdraw the tool from the material. Such monitoring is not possible when the tool is being activated via indirect movements of a robot. Without integrated current monitoring within the control device, the operator would not be able to stop operation of the control device equipped tool in enough time to prevent electronic failure. Thus, a further advantage of the present invention is that the microcontroller monitors current through the power tool motor by use of a smart sensing switch. This prevents tool failure by sensing a stall condition in which electronics would fail due to a maintained spike in electrical current. When a stall current is detected by a measurement greater than a predefined threshold current (specific to the individual tool), the controller disconnects the electrical circuit through the tool's motor. The tool cannot be restarted until a specific motion input is sensed by the device.

The self-contained control device of the present invention controls a power tool without using a cabled connection to the robot chassis, integrated slip ring connections in the robot's gripper, or auxiliary ports on the robotic controller. It can be controlled indirectly through the motion of the gripper. This is a large advantage over using a separate wireless transmission controller within the tool because it utilizes the range of the robot's expensive and powerful wireless transmitter. In at least one embodiment there are few to no auxiliary channels on the robotic radio transmitter itself.

The control device of the present invention can be used with any robot equipped with a two-jaw gripper mechanism regardless of the auxiliary port configuration. Only mechanical modifications of the power tool are necessary to adapt to any robotic platform equipped with a two jaw gripper. Electrical modifications of the robotic platform would be significantly more difficult, requiring teaming arrangements between all robot suppliers to develop a standard electrical interface.

Because the tool is not tethered to the robot, it can be withdrawn from a tool changer, used, and placed back onto the rack to enable the gripper to be used elsewhere. This feature saves battery energy if the tool has to be enabled before deployment down range. This feature also saves time. For example, it allows the gripper to drop a tool downrange, providing for further utility and saving battery energy without requiring that the robot be brought back for reconfiguration.

The control board also features a current sensing smart switch used to prevent electrical damage to the tool. This current sensing switch deactivates the power tool's motor when a current spike above a tool specific current threshold is exceeded.

The system does not require a physical cable or electrical connection (through the gripper) to the robotic platform. Thus, as mentioned above, tools equipped with the control device of the present invention can be powered down and simply placed onto the ground leaving the grippers on the robot to perform any other task. Additionally, the robot chassis can be equipped with a tool rack. In robotics, a tool rack's function is to store tooling in a predefined location for the robot to [automatically] acquire various tooling. Tools can be picked and placed in seconds allowing the robot increased functionality and efficiency. Similarly, once use of a tool is complete, the tool can be stowed, or if the tool has been put down it can be picked up when required. By adding additional tools that perform various functions, the robot's capability is thus more robust and efficient.

The control device feature is an inexpensive and easy method to implement effective control of power tools. Particularly as compared to typical gripper designs widely used in the industry. Integrated contacts in the gripper would not exclude these robotic platforms from utilizing the proposed control circuit on any external auxiliary device.

The proposed invention does not require any electrical connection between the robot and tool. The tool is controlled by placing a circuit board in series between the tool's motor and battery. In one embodiment, the circuit of the present invention controls the power to the motor based on feedback from a tilt switch wired to the printed circuit board. The operator simply rotates the robot's gripper holding the control device equipped tool 360 degrees clockwise to turn the tool "on". To turn the tool "off", the robot's gripper holding the control device equipped tool is rotated 360 degrees counterclockwise. Since the power and control is integrated into the tool the operator is now able to pick up or put down tools without the need for a tether cable to activate the device. This will allow for automatic tool exchange without the need for human intervention.

As described herein, the example embodiments provide a circuit that activates auxiliary devices through a prescribed motion sequence. While the examples concern power tools for robotic applications, it is contemplated that other types of devices may be used with the control device circuit. It is also assumed that the example activation motion sequences could be modified for translation, rotation and various time schemes. In one embodiment the circuit of the present invention is a circuit board that has a tilt switch, micro controller and current sensing switch. The circuit board is added in line between the controlled device and its battery. This supplies battery power to the circuit board and allows the circuitry to control power to the tool. The micro controller monitors the tool's orientation and recognizes when the board is being rotated clockwise or counter-clockwise. If a full 360 degree clockwise rotation occurs in a pre-determined time period window, then the micro controller activates the current sensing switch and turns on the tool. If the rotation does not occur within a specified pre-determined time period window, then the micro controller will not switch on the tool and it waits for a full 360 degree rotation to occur within the designated time period. If the device is rotated 360 degrees counter-clockwise within a second predetermined time period, then the circuit board cuts off the power to the tool. The range of time required to initiate an event is specific to the robot providing the motion input to the controller; the dynamics of the robotic gripper rotation axis provides a specific rotation is a specific amount of time. Measuring both the rotation input and the time of this event allows the controller to prevent false "on" or "off" logic decisions. In alternative embodiments the predetermined time period for proper rotation is between 5-10 seconds.

Hardware and software must be defined to properly monitor the orientation during high vibration. This requires that the software implements adequate data filtering and buffering of the motion sensor input to negate false events caused by random vibration. The orientation resolution required for "on"/"off" control circuitry is significantly lower than for output speed control circuitry. Although sensors such as a tilt switch have lower positional resolution they are more resistant than accelerometers and gyroscopes to high amplitude vibrations.

FIG. 1, illustrates an exemplary control device equipped system including an external device 100. In one exemplary embodiment, the external device is a cordless grinder. In an alternative exemplary embodiment, the external device 100 is a Dewalt® 18v grinder, Part Number: DC411. The external device 100 is mounted within a mechanical housing 104 used to mount the external device 100 securely in the robotic gripper or the external device itself 100. The attachment to the robotic gripper is aided by the use of vertical blocks 108 and lateral blocks 106 custom machined to fit the robotic gripper available on common robot platforms in this embodiment. The external device 100 is powered by a battery 102. In one exemplary embodiment, battery 102 is available by Dewalt® as distributed by the company for use in any of the company's 18v cordless tools.

Figure 2:
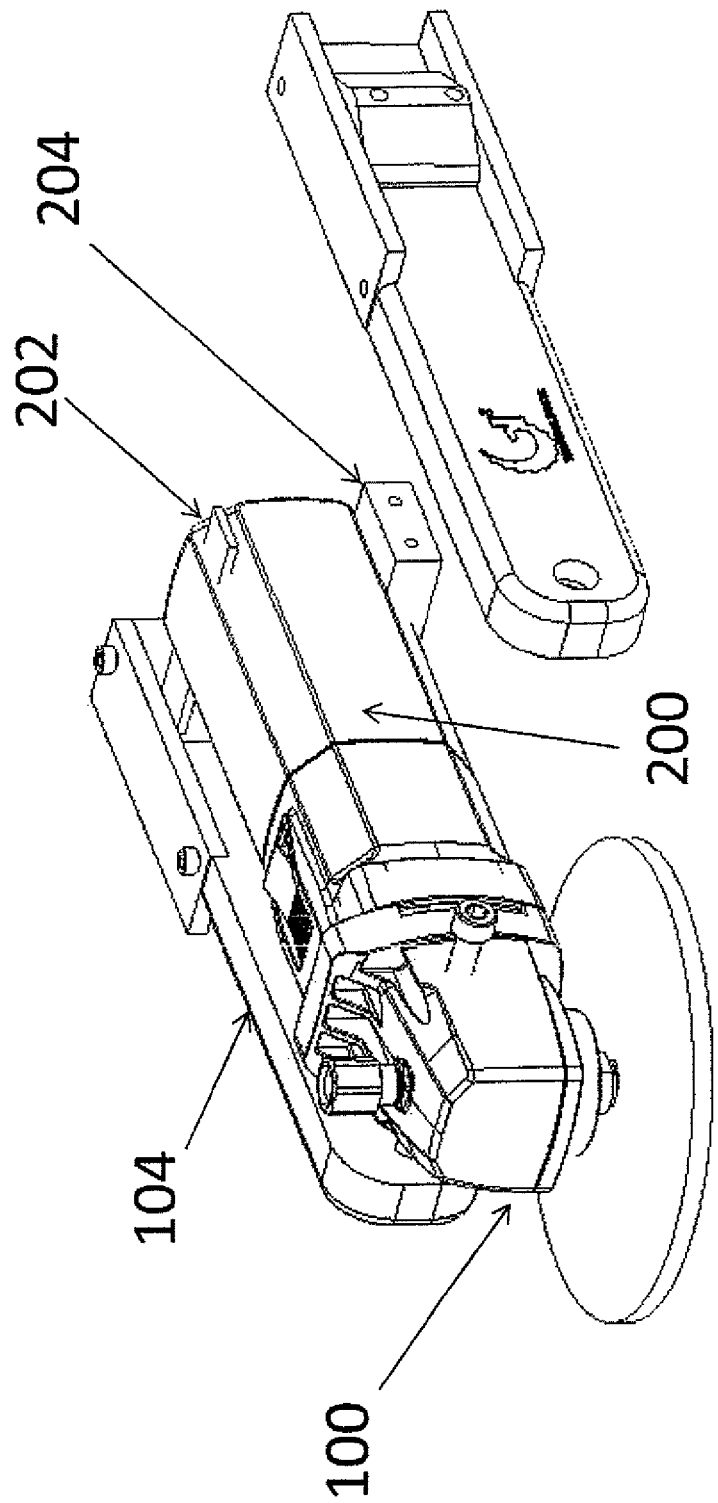
FIG. 2 illustrates an exploded view of a rotation activated tool system equipped cordless grinder.

FIG. 2, illustrates an exploded view of the external device 100 and its housing 104. In general there are many ways to adapt an external device to be mounted within the grippers of a robot. In the example shown in FIG. 2, a bar 204 is inserted through the external device's plastic housing while another plate 202 is mounted on the rear of the housing to prevent rotation of the external device within the housing 104. In some embodiments of the present invention, mechanical housing 104 allows the square geometry of robotic grippers to grasp rounded features comprised in external device 100.

In one embodiment a printed circuit board 200 is mounted within the housing 104. In one embodiment, mounting is achieved using electrical potting epoxy. In a further exemplary embodiment the electrical potting epoxy is Loctite Part Number 11C. The housing 104 can also protect the printed circuit board 200 from foreign objects or impact from typical use. The custom brackets are designed to hold each individual device in the robot's gripper. The circuit board is embedded into the housing in a manner that forced air cooling from the tool passes over the circuit board to reduce thermal shutdown of the switch.

In one embodiment of the printed circuit board 200, a microprocessor, a tilt switch and a smart current switch integrated circuit are populated onto a printed circuit board. In alternative illustrative embodiments the microprocessor is a Freescale Semiconductor Part Number MC9S08QG8CDTER, the tilt switch ROHM RPI-1031 and the smart switch integrated circuit is an Infineon Technologies BTS555 E3146.

Figure 3:
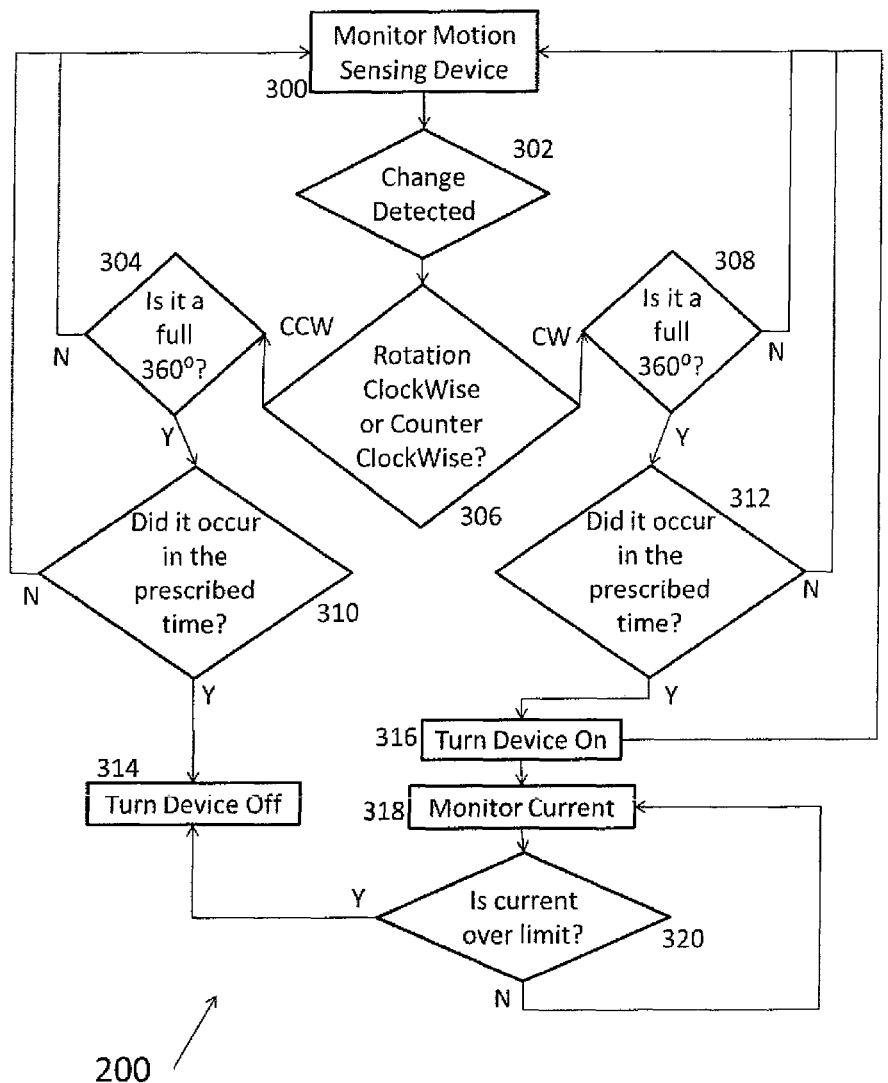
FIG. 3 is a flowchart showing exemplary operational steps for a control board of the present invention.

FIG. 3 illustrates operation of an embodiment of a controller of the present invention. As illustrated, when the printed circuit board 200 is powered, the motion sensing device is constantly monitored (step 300) to sense an input to the system. When a change has been detected (step 302), a decision is made as to whether the change was a rotation about axis 114 in the clockwise rotation 110 or counter clockwise rotation 112 (step 306).

Where it is determined that the detected change is a rotation about axis 114 in the clockwise rotation 110, the system quantifies if the rotation was a full 360 degrees (step 308). If the full 360 degrees is not achieved, the processing circuitry goes back to step 300 to continue monitoring the tilt switch for sequential inputs. If the rotation was a full 360 degrees (step 308) and if the rotation occurred in the prescribed amount of time (step 312) the processing circuitry turns the device on (step 316).

Once step 316 has occurred and the device's motor 408 (FIG. 4) is running, the motion about axis 114 is still continually monitored. Where it is determined that the detected change is a rotation about axis 114 in the counter clockwise rotation 112 (step 306), the system quantifies if the rotation was a full 360 degrees (step 304). If the full 360 degrees is not achieved, the processing circuitry goes back to step 300 to continue monitoring the motion sensing device for sequential inputs. If the rotation was a full 360 degrees (step 304) and the rotation occurred in the prescribed amount of time (step 310) the processing circuitry turns the device off (step 314).

Figure 4:
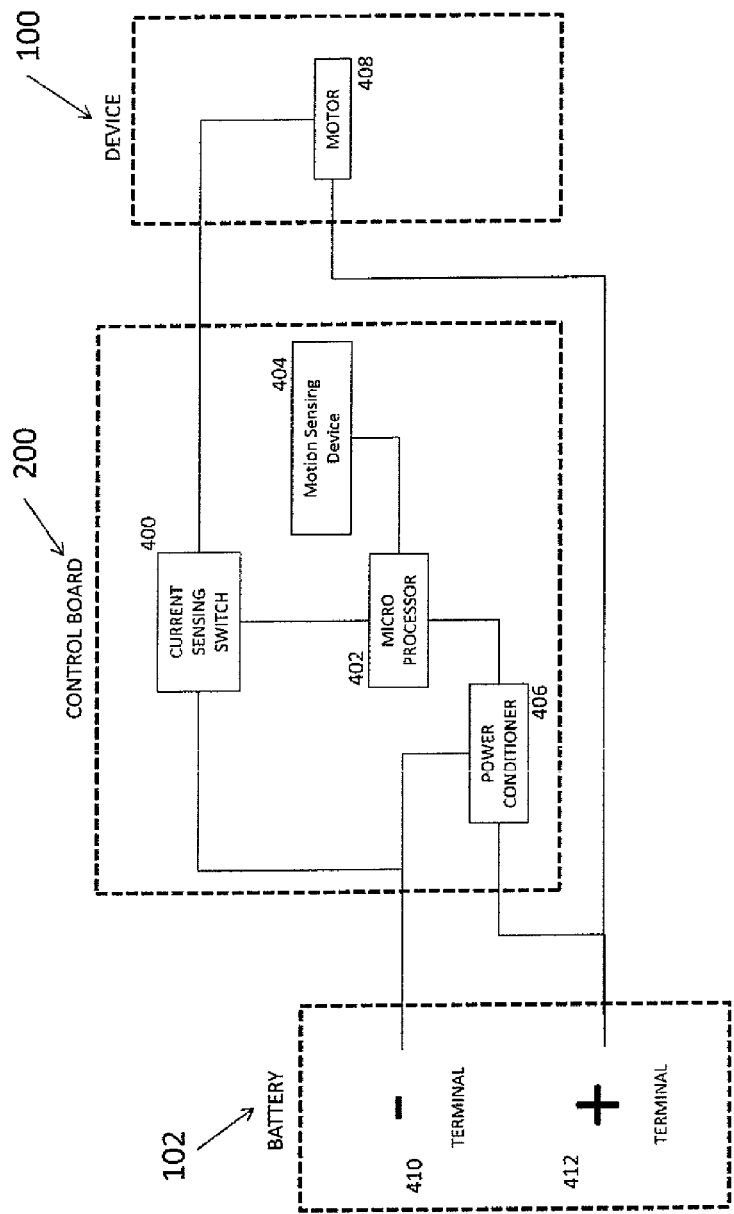
FIG. 4 provides a block diagram an exemplary control board of the present invention.

Once step 316 has occurred and the device's motor 408 is running, the current is monitored in step 318 by the current sensing smart switch 400 (FIG. 4). When the device is activated the current sensing switch monitors the circuit to ensure that the current stays below a threshold value that would otherwise damage the tool. If the current exceeds the threshold value then the circuit board disables the power to the device to protect it. If a current measurement made in step 318 is determined to be over a specified limit in step 320, the device is turned off. If no overcurrent is measured, the device continues to run and monitor current in step 318.

While the current sensing device is monitoring current in step 318, the microprocessor is simultaneously monitoring the measurements of the tilt switch (step 300). These loops are continuous during normal operation until the processing circuitry determines steps 302, 306, 304 and 310 have been fulfilled to turn the device off in step 314. In one embodiment, the current sensing device is a current sensing switch. In an alternative embodiment, the current sensing device inputs current level into the microprocessor.

Another aspect of the present invention relates to a control device for activation or deactivation of an auxiliary device of a robotic system. Briefly, rotation of an auxiliary device of a robotic system is used to control activation or deactivation of the auxiliary device. This type of control scheme requires the controller to know when the auxiliary device is ready for activation or deactivation. When the robotic system's gripper holding the auxiliary device is rotated, rotational motion is detected and the control device powers up or powers down the auxiliary device. Rotational motion is detected and acted upon only when the robotic system's gripper holding the auxiliary device is rotated. In an exemplary embodiment, rotational motion of the auxiliary device about a longitudinal axis is monitored using a motion sensor disposed in the auxiliary device. Exemplary motion sensors that can be used in embodiments of the present invention include tilt switches, accelerometers, compasses, inertial sensors, and the like. In some embodiments of the present invention, a combination of two or more motion sensors can be used to detect rotational motion. Motion sensors used in embodiments of the present invention measure the angular velocity, angular displacement, and/or direction of rotation, which is used by the controller as a basis for switching "on" or "off" the auxiliary device.

During operation, the motion sensor monitors rotational motion of the robotic system's gripper with respect to the longitudinal axis of the auxiliary device. A microcontroller implemented by the control device receives input from the motion sensor, monitors the robotic system's gripper orientation and recognizes when the robotic system's gripper is being rotated clockwise or counter-clockwise. If the microcontroller recognizes that the robotic system's gripper rotates the auxiliary device a full 360 degree clockwise rotation in less than a pre-determined time period, then the micro controller activates the current sensing switch and turns on the auxiliary device. If the rotation does not occur within a pre-determined time period, then the micro controller will not switch on the tool and will wait for a full 360 degree rotation to occur within the designated time period. If the microcontroller recognizes that the robotic system's gripper rotates the auxiliary device a full 360 degree counter-clockwise within a second predetermined time period, then the then the micro controller deactivates the current sensing switch and turns off the auxiliary device.

In some embodiments of the present invention, the microcontroller monitors angular displacement of the auxiliary device based upon input received from the motion sensor and compares the angular displacement to an upper threshold. When the angular displacement of the auxiliary device exceeds an upper threshold, then the microcontroller activates a power conditioning module to drive the auxiliary device's motor at a first predetermined speed. In other embodiments of the present invention, the microcontroller monitors angular displacement based upon input received from the motion sensor and compares the angular displacement to lower threshold. When the angular displacement is less than the upper threshold but exceeds a lower threshold, then the microcontroller activates a power conditioning module to drive the auxiliary device's motor is at a second predetermined speed. It is readily understood that the control device may employ more or less displacement thresholds as well as drive the motor at other speeds. When the angular displacement of the auxiliary device remains above a desired threshold, then the operating speed of the auxiliary device's motor is maintained. When the robotic system's gripper rotates the auxiliary device in the opposite direction and angular displacement of the auxiliary device is lowered below the lower threshold, then the micro controller activates a power conditioning module to reduce or discontinue the voltage applied to the auxiliary device's motor.

FIG. 4 further illustrates the printed circuit board 200. In one embodiment, the hardware includes a battery 102 and a printed circuit board 200. The printed circuit board 200 includes power conditioning module 406, microprocessor 402, motion sensing device 404 and current sensing switch 400. The battery 102 includes negative terminal 410 and positive terminal 412.

Motor 408 within the external device 100 and microprocessor 402 receive power from the positive terminal 412 of battery 102. Conditioning circuit 406 (e.g. voltage regulator) can condition the power from the battery to protect the electronic circuits on the controller. During operation, the motion sensing device 404 is constantly monitored by the microprocessor 402 to determine if a predetermined sequence similar to the clockwise rotation 110 and counter clockwise rotation 112 shown in FIG. 1. If the configured circuitry determines that the correct input was measured by the motion sensing device 404, the microprocessor 402 sends a signal to the current sensing switch 400 to activate the motor 408 by passing current through to the negative terminal 410 of battery 102.

Microprocessor 402 converts the received input from the tilt switch 404 to a value indicating angular or quadrant displacement. By comparing this angular displacement with time gates, the microprocessor determines if a physical movement event has elapsed in a predetermined amount of time. Based on the known amount of time and other parameters such as rotation about X, Y, or Z specified by various channels from the motion sensing device, the microprocessor determines which direction it was moved or axis it was rotated about. Using the stated parameters, processing circuitry (e.g. microprocessor 402) computes movement displacements quantitatively and compares to the time parameters. It is noted that the input to the printed circuit board 200 is the movement induced by the robot or other operating system/individual similar to clockwise rotation 110 and counter clockwise rotation 112.

In alternative embodiments there can be more than one input to the microprocessor, causing an external device to turn on. For example, in one embodiment, the external device is a tool and the external device holder is spring loaded in the forward direction with a pressure switch located at the back of the housing. When the tool makes contact with an object it is then pushed backwards until it closes the pressure switch. The switch initiates an input into the control circuit to turn on the tool(s). As the tool begins to cut through the material the spring loaded housing will advance the tool at a natural rate. The tool will not turn off until the operator removes the tool from the material and rotates the tool in the "OFF" motion sequence. Alternatively, release of pressure in the forward direction can cause a release of the pressure switch causing the tool to turn off.

In another embodiment, the external device holder is equipped with a contact switch that connects the circuit to the tools battery supply. When the robot grippers make contact with the switch it then activates the circuit and begins to monitor motion. This ensures that an external device such as a power tool cannot activate unless held in the gripper and will automatically shut off if it is dropped from the robotic gripper assembly.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention and any equivalent thereto. It can be appreciated that variations to the present invention would be readily apparent to those skilled in the art, and the present invention is intended to include those alternatives. Further, since numerous modifications will readily occur to those skilled in the art, it is not desired to limit the invention to the exact construction and operation illustrated and described, and accordingly, all suitable modifications and equivalents may be resorted to, falling within the scope of the invention. Each reference cited herein is hereby incorporated in its entirety.

What is claimed is:

1. A controller for controlling an auxiliary device of a robotic system, the controller comprising:
    a motion sensing device for detecting an input signal to the robotic system, wherein the input signal is indicative of a rotational movement of the auxiliary device about an axis;
    a processor for determining direction and time of the rotational movement, wherein the rotational movement is a clockwise rotation or counter clockwise rotation about the axis;
    a current sensor for monitoring whether current passing through the auxiliary device is below a threshold value;
    a power circuit for regulating power supplied to the auxiliary device; and
    a microprocessor for monitoring signal detections from the motion sensing device.

2. The controller of claim 1, wherein the processor switches on a motor comprised in the auxiliary device when the rotational movement is clockwise direction and time of completion for the rotational movement is a predetermined value.

3. The controller of claim 1, wherein the processor switches off a motor comprised in the device motor when the rotational movement is counter clockwise direction and time of completion for the rotational movement is a predetermined value.

4. The controller of claim 1, wherein the power circuit disables the power supplied to the auxiliary device when the current sensor determines the current passing through the auxiliary device is below the threshold value.

5. The controller of claim 1, wherein the auxiliary device is selected from a group consisting of reciprocating saws, grinders, circular saws, rotary tools, drills, auto-hammers, camera systems and disrupters.

6. The controller of claim 1, wherein the motion sensing device is a tilt switch.

7. A controller for controlling an auxiliary device of a robotic system, the controller comprising:
a power source for supplying power to the auxiliary device;
a power conditioning module for regulating power received by the auxiliary device from the power source;
a motion sensor for detecting one of a clockwise rotation and a counter clockwise rotation of the auxiliary device about a predetermined axis, wherein the motion sensor generates a voltage signal upon detecting the rotation of the auxiliary device;
a microprocessor for converting the voltage signal generated by the motion sensor to determine the direction of the rotation of the auxiliary device; and
current sensing switch for activating a motor comprised in the auxiliary device based on the voltage signal generated by the motion sensor.

8. The controller of claim 7, wherein the microprocessor converts the voltage signal generated by the motion sensor to a value indicative of angular displacement.

9. The controller of claim 7, wherein the microprocessor monitors the motion sensor to determine completion of a predetermined sequence of rotations comprising at least one of clockwise rotation and a counter clockwise rotation.

10. The controller of claim 7, wherein the motion sensor senses a clockwise rotation of about 360 degrees.

11. The controller of claim 7, wherein the motion sensor detects a counter clockwise rotation of about 360 degrees.

12. The controller of claim 7, wherein the microprocessor transmits an activation signal to the current sensing switch to activate the motor comprised in the auxiliary device by passing current through to a negative terminal of the power source.

13. The controller of claim 7, wherein the motion sensor detects a movement induced by the robotic system, wherein the movement induced by the robotic system comprises one of the clockwise rotation and the counter clockwise rotation.

14. A method of controlling an auxiliary device of a robotic system, said method comprising the steps of:
detecting an input signal to the robotic system, wherein the input signal is indicative of a rotational movement of the auxiliary device about an axis;
determining direction and time of the rotational movement, wherein the rotational movement is one of clockwise rotation and counter clockwise rotation about the axis;
measuring current passing through the auxiliary device;
regulating power to the auxiliary device to maintain the measured current passing through the auxiliary device below a threshold value; and
determining whether the rotational movement of the auxiliary device occurred in a predetermined amount of time.

15. The method of claim 14, further comprising the step of switching on the device motor when the rotational movement is clockwise direction and when the rotational movement occurred in the predetermined amount of time.

16. The method of claim 14, further comprising the step of switching off the device motor when the rotational movement is counter clockwise direction and when the rotational movement occurred in the predetermined amount of time.

17. The method of claim 14, wherein the predetermined amount of time is from about 5 seconds to about 10 seconds.

18. The method of claim 14, further comprising the step of disabling the power to the auxiliary device when the measured current passing through the auxiliary device is above a threshold value.

19. A method for controlling an auxiliary device of a robotic system, said method comprising the steps of:
detecting a rotational movement of the auxiliary device about an axis;
generating a voltage signal indicative of the detected rotational movement of the auxiliary device;
determining the direction of the rotational movement of the auxiliary device based on the generated voltage signal, wherein the rotational movement is one of clockwise rotation and counter clockwise rotation about the axis;
measuring current passing through the auxiliary device;
regulating power to the auxiliary device to maintain the measured current passing through the auxiliary device below a threshold value; and
determining whether the rotational movement of the auxiliary device occurred in a predetermined amount of time.

20. The method of claim 19, further comprising the step of activating a motor comprised in the auxiliary device based on the voltage signal generated.

21. The method of claim 20, wherein the motor comprised in the auxiliary device is activated by passing current through to a negative terminal of the power source.

22. The method of claim 19, further comprising the steps of:
converting the voltage signal generated to a value indicative of angular displacement of the rotational movement;
comparing the value indicative of the angular displacement of the rotational movement with time gates to determine time elapsed;
identifying axis of rotation and direction of the rotational movement; and
determining completion of a predetermined sequence of rotational movements comprising clockwise rotation and counter clockwise rotation.

23. The method of claim 19, further comprising the step of detecting a movement induced by the robotic system, wherein the movement induced by the robotic system comprises one of the clockwise rotation and the counter clockwise rotation.

* * * * *